United States Patent [19]

Piatt

[11] Patent Number: 4,709,245

[45] Date of Patent: Nov. 24, 1987

[54] INK JET PRINTER FOR COOPERATIVELY PRINTING WITH A PLURALITY OF INSERTABLE PRINT/CARTRIDGES

[75] Inventor: Michael J. Piatt, Enon, Ohio

[73] Assignee: Eastman Kodak Company, Rochester, N.Y.

[21] Appl. No.: 945,136

[22] Filed: Dec. 22, 1986

[51] Int. Cl.$^4$ ............................................. G01D 15/16
[52] U.S. Cl. ................................. 346/140 R; 400/126; 400/175
[58] Field of Search .................. 346/140; 400/126, 175

[56] References Cited

U.S. PATENT DOCUMENTS

| | | | |
|---|---|---|---|
| 4,364,067 | 12/1982 | Koto | 346/140 |
| 4,500,895 | 2/1985 | Buck | 346/140 |
| 4,544,931 | 10/1985 | Watanabe et al. | 346/140 R |
| 4,571,599 | 2/1986 | Rezanka | 346/140 R |
| 4,628,334 | 12/1986 | Dagna | 346/140 |

Primary Examiner—Joseph W. Hartary
Attorney, Agent, or Firm—John D. Husser

[57] ABSTRACT

Ink jet printing apparatus, for cooperative printing along a common linear print zone with a plurality of disposable print/cartridges having linear orifice arrays, utilizes a carriage which traverses adjacent and parallel to the print zone and includes positioning structure for insertably receiving and releasably constraining a plurality of print/cartridges in transversely spaced relation with the line of their orifice arrays precisely perpendicular to the direction of carriage traverse and vertically indexed to the direction of carriage traverse. The printer has a detector for sensing and storing the relative-transverse locations of the orifice arrays of the positioned print/cartridges. A printing controller regulates actuation of each positioned print/cartridge in accordance with its detected relative-transverse location to achieve proper horizontal drop placements.

10 Claims, 18 Drawing Figures

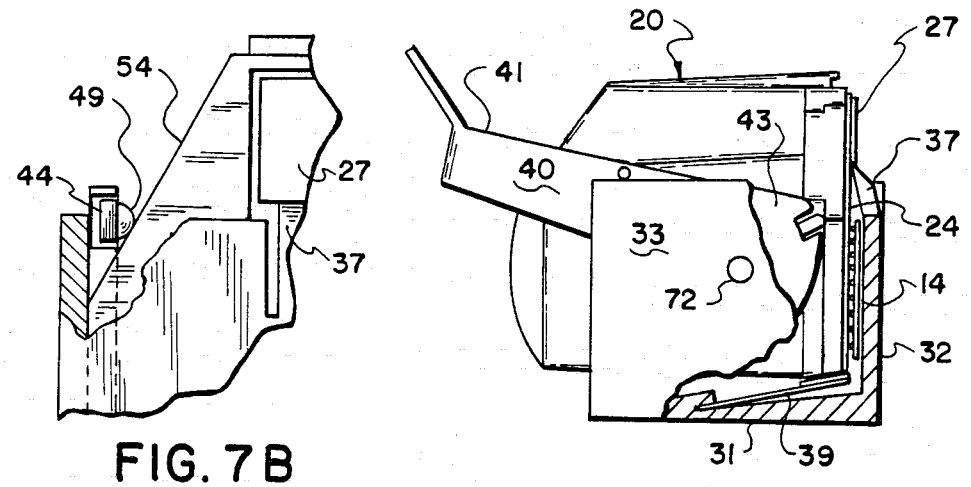
FIG. 7B
FIG. 8
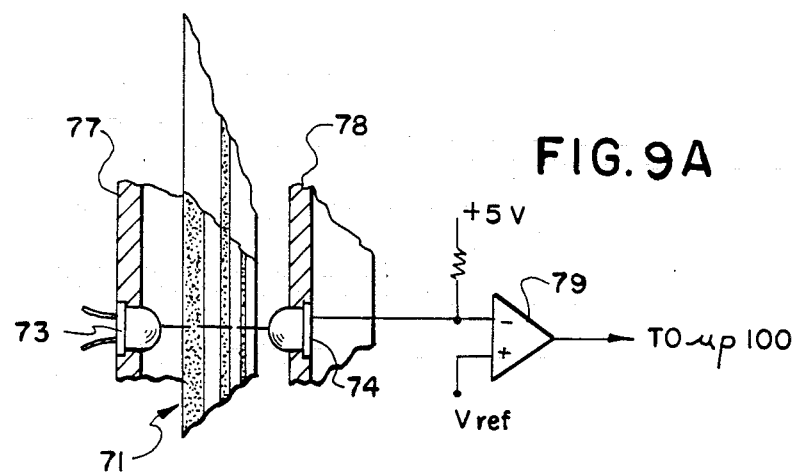
FIG. 9A
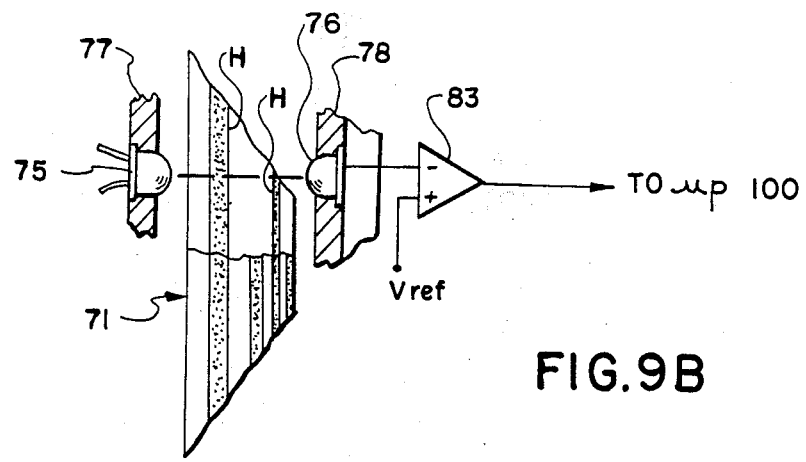
FIG. 9B

INK JET PRINTER FOR COOPERATIVELY PRINTING WITH A PLURALITY OF INSERTABLE PRINT/CARTRIDGES

BACKGROUND OF THE INVENTION

1. Field of the Invention

The present invention relates to ink jet printing apparatus having a plurality of discrete orifice arrays which cooperate in printing operations and more particularly to a positioning and control system of such printing apparatus that enables use of readily insertable print/cartridges.

2. Description of Background Art

There are known drop-on-demand ink jet printer systems in which a print head carriage bearing a print head traverses across the width of a print medium in line printing operation. Between line printing sequences, the print medium is advanced to prepare for the next sequence. One useful approach for such printing systems is to construct the print head element as part of a disposable print/cartridge which contains an ink supply, drop-generating structures and electrical connections adapted for coupling to the printer, which provides drop-generating energy to such an inserted print/cartridge.

Heretofore, such disposable print/cartridge units have been employed one unit at a time in the printing operation and precise positioning and control of the print/cartridge's printing line locus, relative to the print medium is not required. That is, a particular print/cartridge, once inserted, will establish its particular line locus vis-a-vis the printer's print zone. Thus, variation of line locus between different print/cartridges (e.g. because of low tolerances within the print/cartridge and in the print/cartridge printer interface) has not presented problems.

However, there exist applications where it would be desirable to use a plurality of such readily insertable print/cartridges, cooperatively, in page-printing. For example, it may be desired to print more than one color of ink on a printed page. Or, it may be desired to use a plurality of cooperative print/cartridges to increase the page-printing speed of the printer. I have found that in using more than one print/cartridge for cooperative printing on a single page, it is desirable to precisely interrelate the printing loci of those print/cartridges. Otherwise printing artifacts can occur, e.g. due to horizontal and/or vertical misregistration of the component line portions contributed by the respective print/cartridges.

The problem of providing precise interrelation for a plurality of discrete orifice arrays is difficult, even in apparatus where the orifice arrays form relatively permanent parts of a printer. When the orifice arrays comprise portions of insertable print/cartridges the problem is even more difficult, for the print/cartridges should be inexpensive, dictating a minimum of high tolerance construction features and low tolerance assembly.

SUMMARY OF INVENTION

An important object of the present invention is to provide an effective, but structurally simple, approach for precisely interrelating a plurality of readily insertable print/cartridges for cooperative printing in an ink jet printer. The approach of the present invention combines: (i) precise physical positioning of the orifice arrays of such print/cartridges in regard to their vertical relation with the print zone and (ii) information signal adjustments to compensate for differing horizontal interrelations (vis-a-vis the print zone) of the orifice arrays. By only partially relying on physical referencing of the print/cartridges, the approach of the present invention greatly simplifies positioning structures for the printer and print/cartridge. The approach has the advantage of making multi-array printing, via readily insertable print/cartridges, both economical and visually attractive.

In one aspect the invention constitutes an ink jet printing apparatus, for cooperative printing along a common linear print zone with a plurality of disposable print/cartridges having linear orifice arrays, comprising: (a) carriage means for traversing adjacent and parallel to the print zone; (b) positioning means for insertably receiving and releasably constraining a plurality of print/cartridges in a spaced relation with the line of their orifice arrays precisely perpendicular to the direction of carriage traverse and vertically indexed to the direction of carriage traverse; (c) means for detecting the relative-transverse location of the orifice array of each positioned print/cartridge; and (d) means for controlling printing actuation of each positioned print/cartridge in accordance with its detected relative-transverse location.

BRIEF DESCRIPTION OF DRAWINGS

The subsequent description of preferred embodiments refers to the attached drawings wherein:

FIGS. 5–8 are views showing various stages of the print/cartridge positioning sequence;

FIGS. 9A and 9B are schematic perspective views illustrating carriage position detection means in accord with one preferred embodiment of the present invention;

DETAILED DESCRIPTION OF PREFERRED EMBODIMENTS

Figure 1:
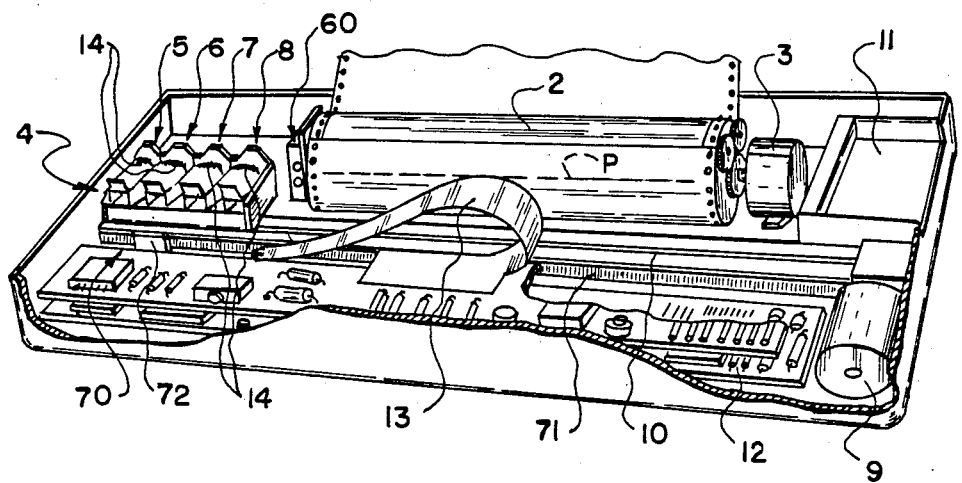
FIG. 1 is a perspective view, with cover portions removed, of one preferred printer embodiment in accord with the present invention.

The ink jet printing apparatus shown in FIG. 1 in general comprises a print medium advancing platen 2 which is adapted to receive sheet or continuous print material, e.g. paper, from an ingress at the lower rear, and under the drive from motor 3, advance successive line portions of the medium past a print zone P, and out of the printer through a printer egress in the top of the printer. During the passage of successive line portions through the print zone, multi print/cartridge carriage 4 is traversed across the print zone so that print/cartridges placed in the four individual carriage nests 5, 6, 7 and 8 can effect printing operations, as subsequently described. The carriage 4 is slidingly mounted on a guide rail means 35 (see FIGS. 3, 4A and 4B) located beneath the print/cartridge support nests 5-8 and a carriage drive motor 9 effects traversing movement of the carriage 4, past the platen face, via an endless cable 10 attached to carriage 4. The printer is electrically energized, e.g. from a battery or DC power source 11, via a control circuit means 12. Electrical energy is supplied to individual print/cartridges by means of ribbon cables 13 which have terminals 14 in the lower portion of each of support nests 5-8.

Figure 2:
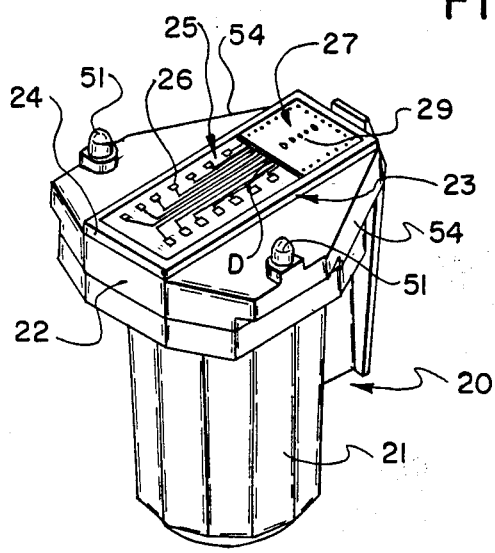
FIG. 2 is a perspective view of one embodiment of disposable print/cartridge which is useful in accord with the present invention.

Referring now to FIG. 2, there is shown one useful print/cartridge embodiment 20, which is adapted to be removably inserted into an operative relation with the printer via carriage 4. The print/cartridge 20 is adapted to be disposable when empty of ink and in general comprises an ink supply reservoir 21 and cover member 22, which covers the ink reservoir and, together with position lugs 51, coarsely positions the print head assembly 23 in nests 5-8. The print head assembly 23 is mounted on the cover member and comprises a driver plate 24 having a plural of electrical leads 25 formed thereon. The leads 25 extend from connector pads 26 to resistive heater elements (not shown) located beneath each orifice 29 of a linear orifice array formed in orifice plate 27. Ink from reservoir 21 is supplied through cover member 22 to a location beneath each orifice 29 of plate 27 (and above the heater element for that orifice). Upon application of an electrical print pulse to a terminal pad by the printer control, the corresponding resistive heater element causes an ink vaporization condition which ejects a printing ink droplet from its corresponding orifice 29. The orifice plate 27 can be electroformed using photofabrication techniques to provide precisely located orifices and is attached to driver plate 23, which is in turn affixed to the cover member 22. Thus it will be appreciated that even though the linear array of orifices 29 is precisely located within the orifice plate 27, its position vis-a-vis the locating portions of cover member 22 and positioning lugs 51 is not at all consistent for different disposable print/cartridges. Print/cartridges of the type just described are known in the art for use in single print/cartridge printers, and, as has been noted, the coarse locating structures are adequate for those applications.

Figure 3:
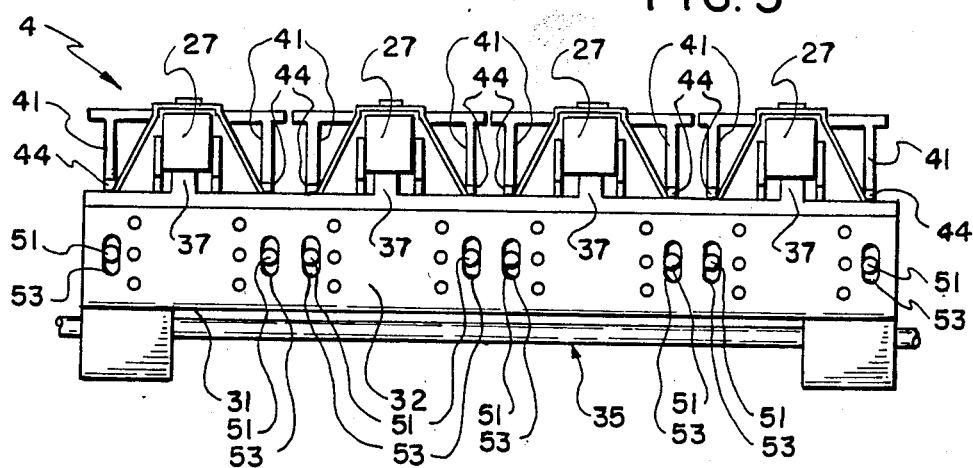
FIG. 3 is a view of the print/cartridge carriage of the FIG. 1 printer embodiment, as viewed from the print zone side of the apparatus.
Figure 4A:
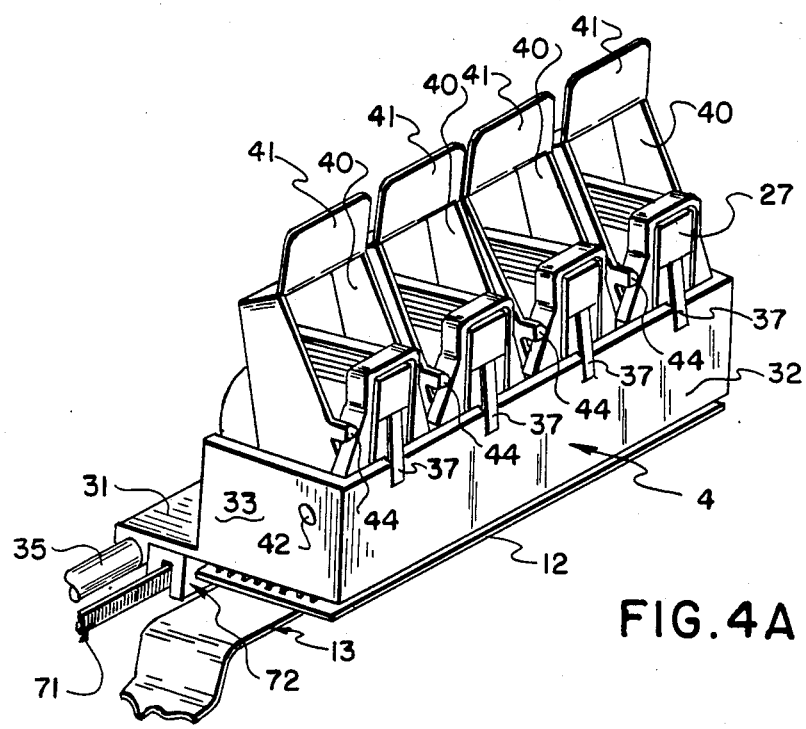
FIGS. 4A and 4B are respectively a perspective and a side view, partially in cross section, of the print/cartridge carriage shown in FIGS. 1 and 3.
Figure 4B:
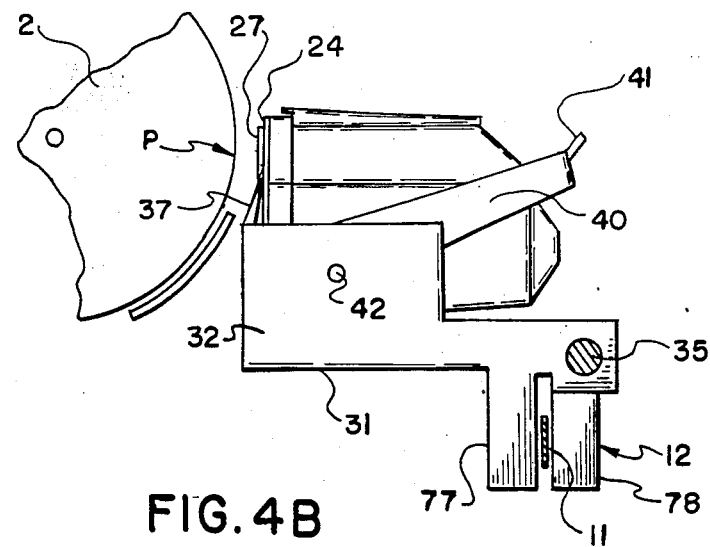

Referring now to FIGS. 3, 4A and 4B, the print/cartridge carriage 4 comprises a bottom wall portion 31, a front wall portion 32 and side wall portions 33 which together form the plurality of print/cartridge nests 5-8 that are adapted to receive and coarsely position print/cartridges with respect to the printing zone P of the printer. The bottom of wall portion 31 is mounted on guide rail means 35 for traversing the carriage across the print zone P in a precisely uniform spacial relation to the platen 2 and in a direction substantially parallel to the axis of that platen's axis of rotation. Thus, the direction of the carriage traverse is substantially orthogonal to the direction of print medium advance.

Figure 5:
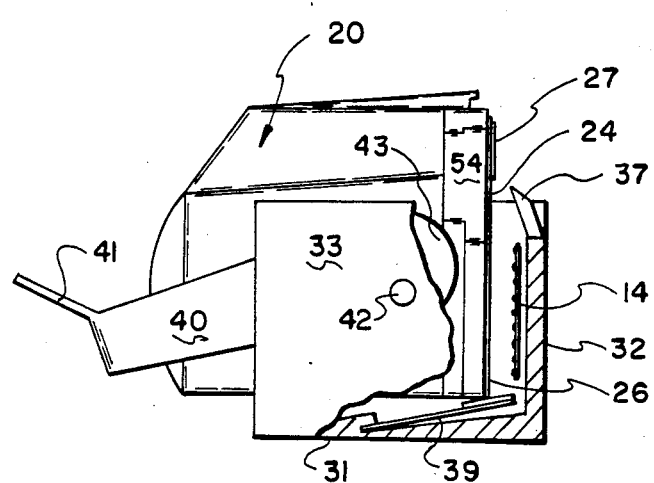
Figure 6:
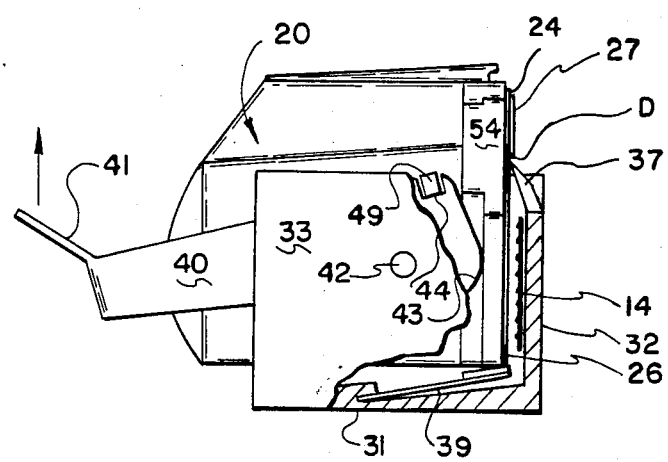
Figure 7A:
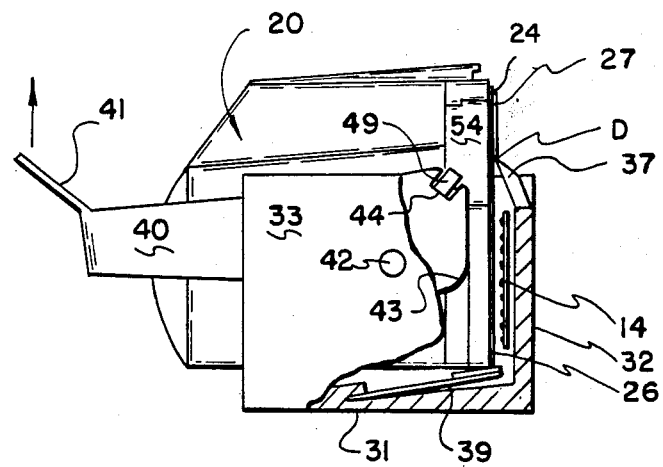

The top of the front wall 32 of each print/cartridge nest 5-8, has, as an upper extension, knife portions 37, which form reference edges that are precisely colinear, parallel to the direction of carriage translation and equidistantly spaced from the linear print zone P. Mounted on the outer side walls of the nests of carriage 4 are fastening means 40 for contacting print/cartridges, which have been inserted into nests 5-8, and moving such print/cartridges into precise operating position in the printer apparatus. Referring to FIG. 5, it can be seen that the fastening means 40 comprises lever arm portions 41, hinge portions 42, camming portions 43 and seating arm portions 44. The bottom wall 31 of each nest 5-8 also comprises a resilient portion 39 and the fastening means is adapted to move the bottom of an inserted print/cartridge into a forced engagement that downwardly compresses resilient portion 39, when the lever arm portion 41 is moved upwardly to the position shown in FIGS. 3, 4A and 4B. When lever arm portion 41 is moved downward, the fastening means 40 is disengaged and the print/cartridge 20 can be hand-lifted from its nest in the carriage 4.

Referring now to FIG. 2, as well as FIGS. 3-8, the orifice plate vertical positioning system is designed to provide a predetermined sequence of engagements between the print/cartridge 20 and the carriage 4. First, the print/cartridge is hand-inserted into a coarsely positioned alignment resting loosely in a nest on top of cantilever spring 39 (see FIG. 5). As shown in FIG. 3, positioning lugs 51 of the print/cartridge are located in vertical slots 53. As the fastening means 40 is rotated clockwise (as viewed in FIGS. 5, 6, 7-A and 8), the cam portion 43 first urges the smooth top surface of the driver plate 24 into forced contact with knife edge 37 (see FIG. 6). At this stage the cam dimples 49 on seating arm portions 44 have not yet contacted the print/cartridge sidewalls. During continued rotation the cam dimples 49 contact shoulder portions 54 of an inserted print/cartridge 20 and move the print/cartridge downwardly against the bias of resilient means 39, while cam portion 43 maintains the forward force urging the driver plate 24 into contact with knife edge 37. During this downward movement, knife edge 37 will slide along the face of the driver plate 24 until a detent surface D of the print/cartridge engages the knife edge (see FIG. 7A). In the embodiment shown in FIGS. 2-8, the detent D comprises a lower edge portion of the orifice plate 27. As the engagement between the knife edge 37 and the detent edge D evolves, the print/cartridge is oriented within the nest so that the detent edge D is precisely parallel to the knife edge. Because the orifice array 29 and the detent edge D of the orifice plate 27 are photofabricated, they can be precisely located relative to one another in an economical fashion. Thus precise positioning of the orifice plate's detent edge D relative to the knife edge 37 of a carriage nest precisely locates the printing orifices (rotationally and vertically) relative to the the traversing path of the printer carriage 4, as well as in a predetermined spacial relation vis-a-vis the print zone P.

Continued movement of the lever arm 41 causes cam surface 43 to move connector pads 26 of the print/cartridge into contact with the terminals 14 in the nest bottom (see FIG. 8). To allow continued movement of the fasten means 40, after full detenting of the orifice plate, the seating arms 44 are slightly flexible in an outward direction (see FIG. 7B) to allow dimples 49 to slip down the sides of shoulders 54. As shown best in FIG. 7B, the thickness of cantilever seating arm 44 behind dimple 49 is less than the other portions of the fastening means 40 to allow this outward movement. The knife edge 37 can yield slightly to the right (as viewed in FIG. 8) to allow firm contact between the cartridge pads 26 and the nest terminals 14.

The particular print/cartridge positioning structure shown in the drawings and described above as well as other preferred physical positioning embodiments, is the subject of U.S. application Ser. No. 945,134, filed concurrently in the names of Piatt, Houser and McWilliams and entitled "Multiple Print/Cartridge Ink Jet Printer Having Accurate Vertical Interpositioning", which is incorporated herein by reference for those teachings. This structure precisely positions the orifice plates 27 and thus the linear orifice arrays 29 of inserted print/cartridges relative to the knife edge 37 of its nest. The knife edges 37 of the print/cartridge nests 5–8 are carefully aligned to be mutually colinear with, and have a uniform spacing from, the print zone P. The line defined by the referencing surfaces of knife edges 37 is precisely parallel to the traversing direction of the carriage, which in turn is approximately orthogonal to the direction of print media advance. Because of the photofabrication techniques employed in fabricating orifice plate 27, the location of orifices 29, relative to the detent edge D, is accurately the same for each print/cartridge orifice plate. Thus the plurality of print/cartridges inserted into nests 5–8 will print cooperatively without any offset artifacts due to vertical, spaced or rotational non-alignments, relative to the print zone P, between the different print/cartridges. While this physical positioning structure is highly useful, it will be understood that other print/cartridge positioning structures can be used in combination with the horizontal location detection system of the present invention.

Thus, according to the present invention, the ink jet printer shown in FIG. 1 also includes a system for detecting and storing the precise relative locations, horizontally (i.e. along the direction of carriage traverse), of the orifice arrays of the cooperative print/cartridges in nests 5–8. Such system in general comprises means for detecting and storing transverse location data for the orifice plate of each print/cartridge and means for computing and storing the interspacings of the print/cartridge orifice arrays based on such location data. In the FIG. 1 embodiment such detecting means comprises a print/cartridge scan detector device 60 located at a fixed position along the path of cartridge traverse and carriage position detector device 70 comprised of a linear encoder strip 71 mounted along the traverse path of the carriage 4 and a strip decoder 72 attached to the carriage for movement in operative relation with the encoder strip 71. In general, the function of the scan detector device 60 is to signal the passage of a unique print/cartridge characteristic that is indicative of the precise transverse location (relative to the scan detector) of that print/cartridge's linear orifice array 29 as the carriage traverse the print/cartridge past the scan detector on its movement toward the print platen 2. In general, the function of the carriage position detector device 70 is to sense and signal successive instantaneous positions of the carriage 4 during its traversing movements.

The location detection means shown generally in FIG. 1, and described in more detail with respect to FIGS. 9–15 is the subject of concurrently filed U.S. application Ser. No. 945,137, entitled "System for Determining Orifice Interspacings of Cooperative Ink Jet Print/Cartridges", by Piatt, Theodoras and Ray, which is incorporated herein by reference as to further teachings of such systems. However, it will be appreciated that various other systems for location detection are possible within the scope of the present invention. For example, the relative transverse orifice array locations can be detected physically at the home position of the carriage, by firing drop streams upon a sensor. Or, the cartridges can be directed to print a test pattern which is observed to determine relative transverse locations of the arrays. Other techniques will occur to those skilled in the art.

Figure 10:
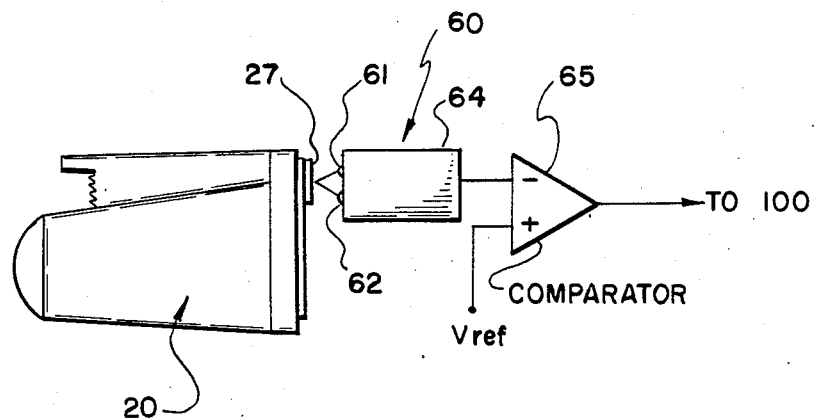
FIG. 10 is a schematic perspective view showing one means for detecting relative-transverse location of print/cartridge orifice arrays in accord with the present invention.
Figure 11:
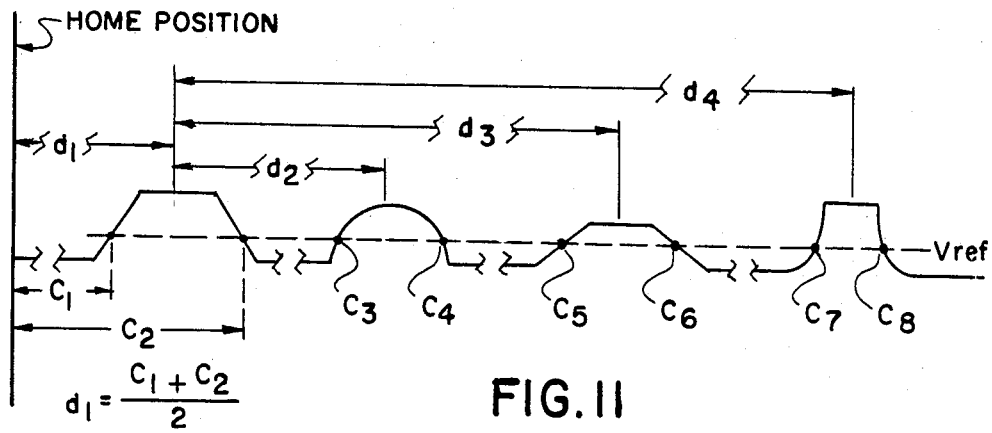
FIG. 11 is a diagram of a detector signal waveform which is exaggerated for purposes of explaining operation of the present invention.

Referring now to FIG. 10, the scan detector device 60 comprises an infrared emitter 61, e.g. an LED, and infrared detector 62, e.g. a phototransistor, both supported in predetermined orientations and spacial relations in sensor block 64. Thus, the emitter 61 is located to direct light obliquely toward the path of a traversing print/cartridge 20 so that when an orifice plate 27 of such cartridge is in the beam of the emitter, its light is reflected by the bright nickel orifice plate metal to return to the detector 62 as shown. Other portions of the print/cartridge are formed of non-reflective material, e.g. black plastic, so that the light energy received by detector 62 during the passage of an orifice plate is significantly greater than when an orifice plate is not in the path of the emitter light beam. The waveform shown in FIG. 11 provides an exaggerated example of such light variation effects as manifested in the voltage signal from the detector as four print/cartridges move therepast. As illustrated schematically in FIG. 10, the output of detector 62 is coupled to comparator 65; and when the detector voltage $V_D$ from the detector 62 increases above threshold voltage $V_{ref}$, the shift of comparator 65 to its low state is transmitted to the interrupt interface 103 of a microcomputer 100. As will be described in more detail subsequently, the microcomputer interprets such signal from the comparator 65 as the passage event for a leading edge of orifice plate 27. When the print/cartridge orifice plate passes out of the beam from emitter 61, the output of comparator 65 returns to a high state signalling the microcomputer of this trailing edge passage event. One important purpose of carriage position detector 70 is to relate the leading edge/trailing edge events signalled by the scan detector 60 to the positions of the carriage along its traversing path.

Referring now to FIGS. 9A and 9B, as well as FIG. 1, carriage position detector 70 comprises a strip decoder portion 72 which is mounted for movement with carriage 4 and which includes emitter and detector pairs 73, 74 and 75, 76. The emitters and detectors are disposed in opposing relation respectively on extensions 77, 78 of carriage 4 so as to sandwich the linear encoder strip 71 during the traversing movement of the carriage. As shown in FIG. 9A, the lower portion of the linear encoder 71 comprises a plastic strip of alternating transparent and opaque sections, e.g. each section 2.6 mils wide. Emitter-detector pair 73, 74 is arranged to pass and receive light through this lower strip portion and the power to the emitter 73 is adjusted such that the detector 74 operates in a non-linear region. Thus, the detector 74 will output a triangular sinusoidallike voltage waveform in response to modulation by the lower portion of strip 71. The signal from detector 74 is coupled to a comparator 79 which has a threshold voltage level $V_{ref}$ such that the output of comparator 79 changes state at the same stage of every transparent-opaque encoder transition past the detector. The output of comparator 79 provides an essentially square waveform as a second input to a port 84 of computer interrupt interface 103.

Emitter-detector pair 75, 76 shown in FIG. 9B is arranged to pass and receive light through the upper part of the encoder strip which has only opaque traverse location markers H. The output of detector 76 is compared by comparator 83 to $V_{ref}$ and the low output from comparator 83 signals the microcomputer 100 that the carriage has reached a certain point(s) along its printing path, e.g. a turn-around location.

Figure 12:
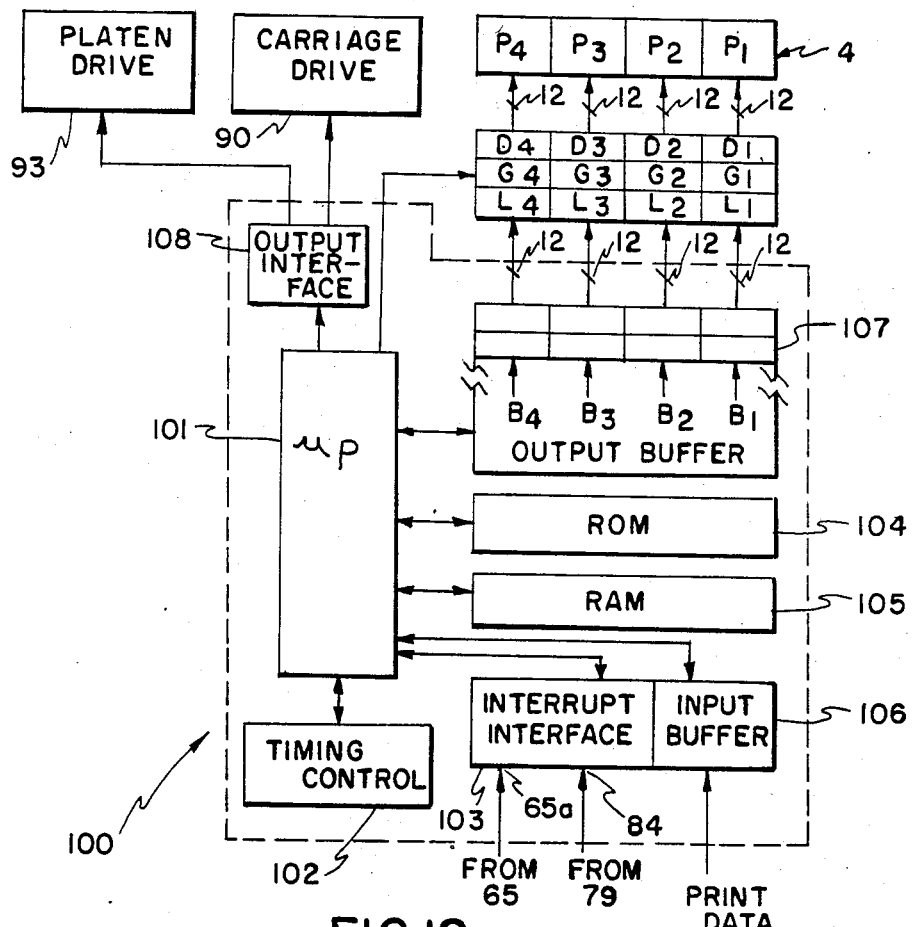
FIG. 12 is a schematic illustration of one control system useful with the FIG. 1 approach for detecting and storing orifice array locations in accord with the present invention.

Considering the foregoing, there has been described means for detecting the print/cartridge orifice plates' passage of a predeterminedly placed detector and means for detecting instantaneous positions of the carriage 4 along its transversing path. The cooperative functioning of these detecting means in accord with the present invention can be further understood by referring to FIGS. 12-14. As shown in FIG. 12, microcomputer control system 100 comprises a microprocessor 101 with related timing control and interrupt interface sections 102, 103 and cooperative read only memory (ROM) 104 and read/write memory (RAM) 105. The system 100 also includes input and output buffer interface sections 106, 107 adapted to receive, store and output data for the microprocessor 101.

Figure 13:
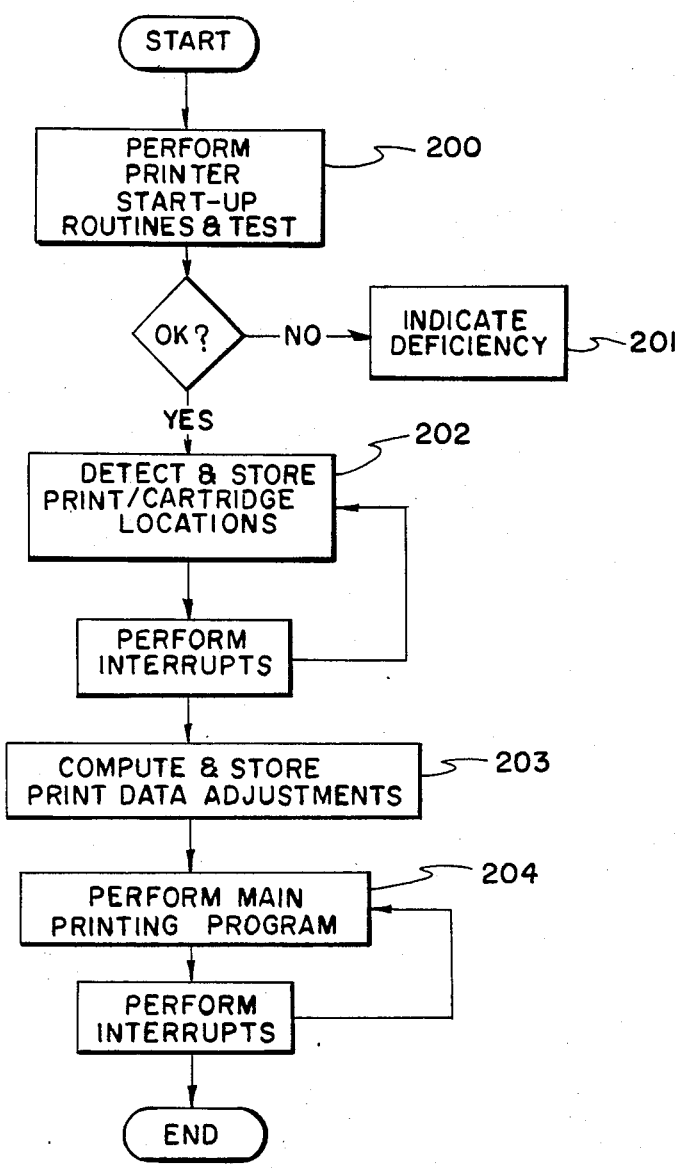
FIG. 13–15 are flow charts useful for explaining process functions of printing apparatus in accord with the present invention.

As indicated by the general flow chart of FIG. 13, the ROM 104 contains programs whereby the microcomputer is, in general, adapted, on start-up, to perform routines such as activating paper drive and carriage drive motors, supplying energy for the print/cartridges, etc., as well as tests for the attainment of proper start-up conditions, e.g. adequate power supply, paper supply, etc. As also shown in FIG. 13, before commencing with the main printing program 204, the control system is programmed, in ROM 104, to detect and store (process 202) the locations of inserted print/cartridges and to compute and store (process 203) data for adjusting the flow of print data from the output buffer 106, to thereby control the firing of inserted print/cartridges (in process 204).

Figure 14:
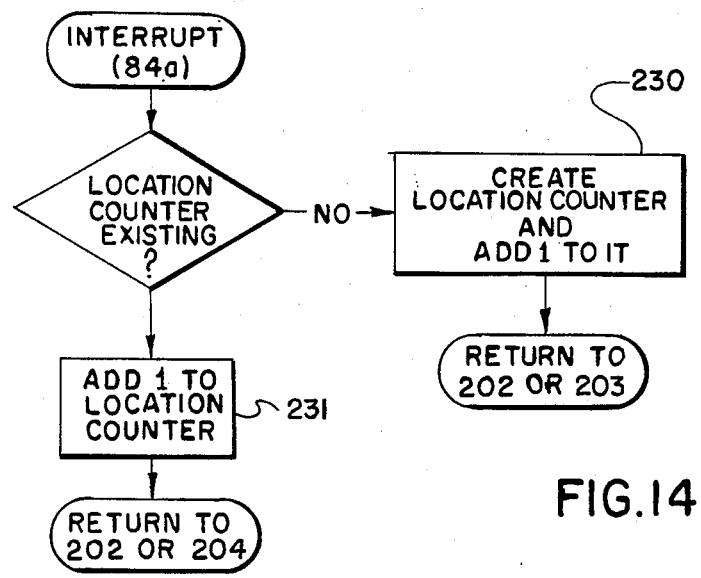

More specifically, after print/cartridges $P_1$-$P_4$ have been inserted as described above and the start-up test routines (process 200) have been performed, the printer proceeds, under the control of a program in ROM 104, with its detect and store function (process 202) as follows. The carriage drive 90 is activated to move to a predetermined reference location (or home station) to the left of the sensor 60 and to then traverse it from left to right past the sensor at a nominal scan speed which is slower than the traversing speed during printing. When the carriage position detector 74 initiates the first pulse from comparator 79 to interrupt port 84 of the interrupt interface 103, the procedure shown in FIG. 14 is transferred from ROM 104 to RAM 105. Thus, the interrupt signal will then effect creation of a carriage position counter (process 230) in RAM 105, input a count of "1" to that counter and return the microprocessor to other control functions. When the next pulse from comparator 79 is input at port 84, the carriage position count will be added to by 1 (process 231) and the microprocessor again returned to other work. The sub-routine described with respect to FIG. 14 operates both in the detect and store function (process 202) and the main printing function (process 204).

Figure 15:
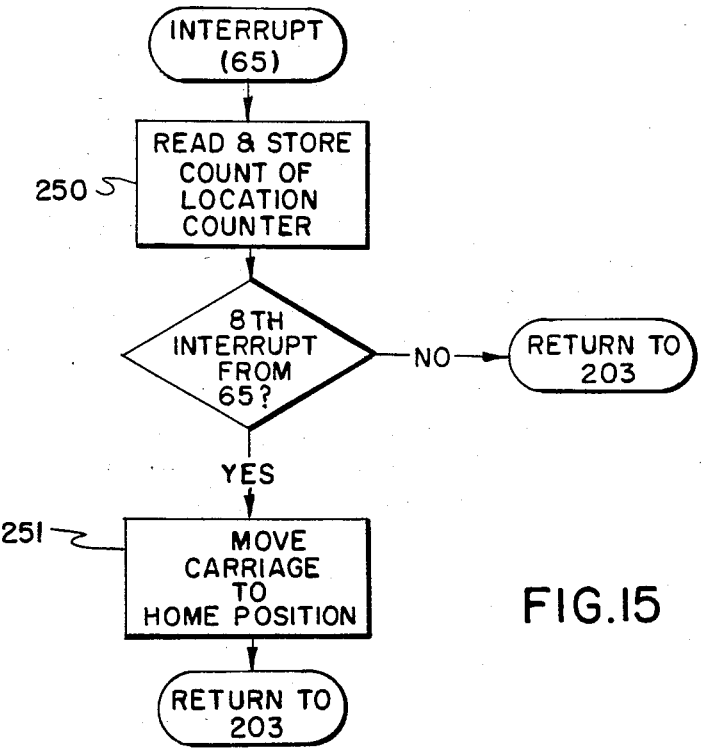

Referring next to FIG. 15, as well as FIG. 12, it can be seen that when a signal from comparator 65 of orifice plate detector 60 is supplied to interrupt port 65a of the microcomputer, a subroutine is addressed in ROM 104 which directs the microprocessor in reading and storing (process 250) the mark count then stored in the carriage position counter, that has been created and updated by the FIG. 13 subroutine.

The above-described procedures continue as the print/cartridge moves the leading and trailing edges of each of the print/cartridges orifice plates past sensor 60. After the 8th interrupt procedure of reading and storing, an orifice plate edge data (assuming a four print/cartridge printer), the carriage 4 is returned to the reference location (process 251) and computations in accord with process 203 commence. In general, the process 203 is performed by microprocessor 101 under the control of a program in ROM 104, using orifice location data stored in RAM 105 as described above, and has the purpose of determining and storing the precise transverse distances between the orifice arrays of print/cartridges $P_1$-$P_4$, as then located in carriage 4. These determinations are useful in coordinating printing with inserted print/cartridges to avoid drop placement artifacts in the transverse page direction.

Because the orifice arrays are precisely located relative to the orifice plate edges, the process of determining the orifice array interspacings based on the location counts of the orifice plate edges can be achieved in various ways by computer 100. For example, a simple algorithm stored in ROM 102, e.g. center=$(C_1+C_2)\div 2$, can be used to convert the leading and trailing edge counts to establish a count distance $d_1$ from the reference location for the center of the transverse dimension of the first orifice plate. Further, as the diagram in FIG. 11 illustrates, the orifice plate edge counts $C_1$-$C_8$ are known for each orifice plate, and the count distances ($d_2$-$d_4$) of the other orifice plate counters from the first array can be computed; e.g.

$$d_2 = \frac{C_4 + C_3}{2} - d_1.$$

It is preferred to compute and store the locations of the 2nd, 3rd and 4th print/cartridge orifice plate centers relative to the count distance representing the position of orifice center of the first print/cartridge for this is a simple mode of precisely determining the orifice array interspacings. However, the interspacing of the orifice arrays can be computed and stored in accord with other algorithms.

Summarizing, the determinations of the transverse spacial distances between the corresponding portions of the orifice plates (and thus between the orifice arrays), as represented by counts $d_2$-$d_4$ are stored in memory 105 (by process 203), and these constitute the data useful for coordinating the output of printing signals to the respective print/cartridges so as to obtain proper transverse interrelation of drop placements on a commonly printed line. Such drop placement coordination can be accomplished in various modes under the control of programs in memory in 102.

Figure 16:
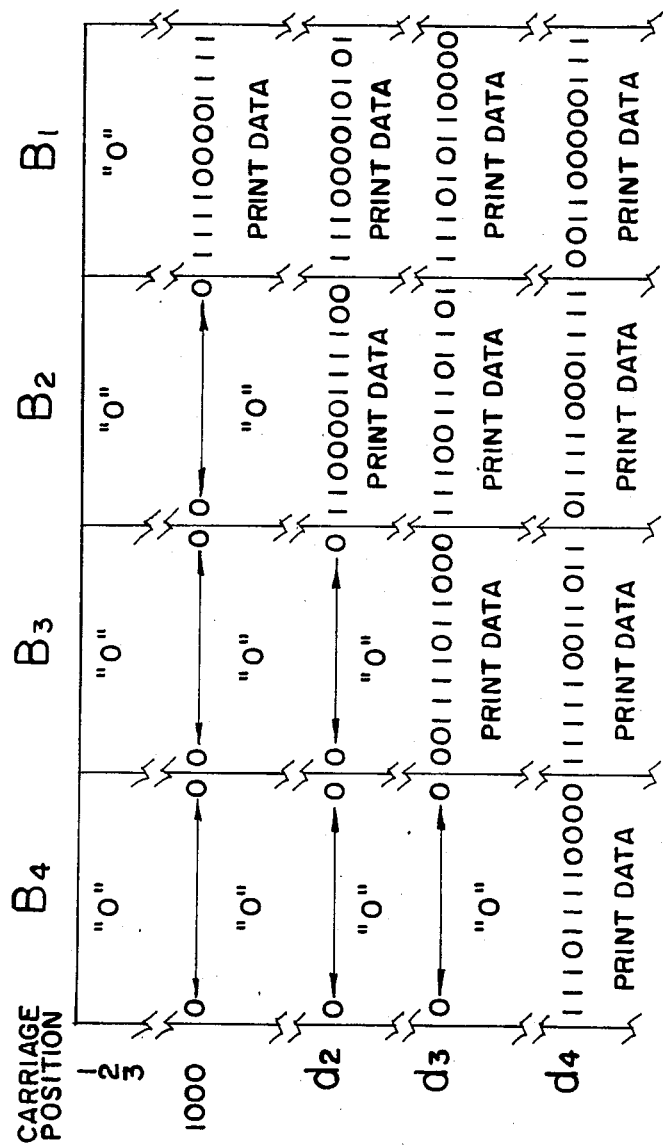
FIG. 16 is a diagram useful in explaining one preferred mode of print signal adjustment utilizing information attained in accord with the present invention.

For example, referring now to FIGS. 12 and 16, one embodiment for effecting transverse drop placement coordination using the information determined and stored in accord with the present invention will be described. Thus, it can be seen that the output buffer 107 of microcomputer 100 contains separate channels $B_1$–$B_4$ respectively for receiving print data for each of the print/cartridges $P_1$–$P_4$. In operation, the print data is received by the input buffer of microcomputer 100 and loaded into the buffers $B_1$–$B_4$ by the microprocessor in particular sequences determined by a program in ROM 104 utilizing the orifice plate location data described above which is stored in RAM 105. More particularly, referring to FIG. 16 (in which "1" indicates a digital signal to eject an ink drop and "0" indicates a non-eject signal), it can be seen that data is loaded into buffer channel $B_1$ so that the first print signals will be ready for output from the buffer at position 1000 of the print head carriage 4. That is, this example assumes that the first possible line print position is 1001 encoder transitions to the right of a reference location (e.g. the detection of the encoder mark H or the detection by a dedicated carriage sensor and that the buffer is actuated to advance data in its channels one position per encoder transition. Referring to FIG. 12, as well as FIG. 16, it will be seen that upon the 1001 transition pulse, latch $L_1$ is loaded with print/no-print data from buffer $B_1$ while latches $L_2$–$L_4$ are loaded with all 0's from their respective buffer channels. Thus, when the gates $G_1$–$G_4$ are enabled at this print position 1001, the twelve (12) drives for the 12 orifices of print/cartridge $P_1$ will be fired according to the "0" or "1" information in the latches $L_1$ and appropriate ink drops will be ejected to the print line by $P_1$. As shown in FIG. 16, this condition will continue until traverse position equal to count distance $d_2$ evolves, at which time print/no-print data for print/cartridge $P_2$ will be ready for output to its latches $L_2$.

Reflecting on what has been described, it will be understood that the loading of the buffers $B_1$–$B_4$ will accomplish a delay between the commencement of printing which has been computed and stored (as described previously—process 203) to attain accurately coordinated transverse drop placement between the print/cartridges as physically positioned. Thus, print/cartridge $P_2$ will commence printing $d_2$ mark transitions after $P_1$, $P_3$ will commence $d_3$ mark transitions after $P_1$, and $P_4$ will commence $d_4$ mark transitions after $P_1$. Each of the buffers will continue to output data to its latches until its full line of print data is completed and will therefater output all "0's". Therefore, as would be expected, print/cartridge $P_1$ will cease printing first, $p_2$ second, $p_3$ third and $p_4$ will cease printing last.

If desired, the twelve drivers for each print/cartridge can be fired sequentially (e.g. 1 to 12 or in pair sequence 1 and 6, 2 and 7, etc.). This is accomplished by the gate control signals supplied by microprocessor under the control of a sequence program in ROM 104. This can be advantageous from the viewpoint of reducing thermal and acoustic crosstalk caused by the simultaneous firing of adjacent thermal elements and of reducing peak power requirements for the drivers' energy source. In addition, a program of ROM 104 can provide for the microprocessor's sequential enablement of each gate groups $G_1$–$G_4$.

Other preferred techniques for adjusting the printing from a plurality of print/cartridges in accordance with variations in transverse interspacing of their orifice arrays can be provided, e.g. to accommodate: (i) retrace printing, (ii) higher resolution drop placement coordination and (iii) sequential and/or multiplexed driver operations. Such techniques constitute the subject of concurrently filed U.S. application Ser. No. 945,138, in the names of Piatt and Ray and entitled "Transverse Printing Control System for Multiple Print/Cartridge Printer", which is incorporated herein by reference for those teachings.

The invention has been described in detail with particular reference to preferred embodiments thereof, but it will be understood that variations and modifications can be effected within the spirit and scope of the invention. For example, it will be appreciated that the features of the present invention can also be used with advantage in ink jet printing systems adapted to use insertable print heads which are couplable to ink reserviors that are not integral with the print head.

We claim;

1. Ink jet printing apparatus for printing along a linear print zone with a plurality of traversing print heads, each including linear orifice arrays, said apparatus comprising:
  (a) carriage means for traversing said print zone and for receiving and physically indexing a plurality of such print heads in a transversely spaced relation with their orifice arrays precisely perpendicular to the direction of carriage traverse and in precise vertical inter-alignment based on said direction of carriage traverse;
  (b) means for detecting and storing the relative transverse locations of indexed orifice arrays; and
  (c) means for controlling the printing actuations of each indexed print head in accordance with its detected transverse location;
whereby the drop placements of such indexed print heads are accurately interrelated within the line commonly printed thereby.

2. In ink jet printing apparatus adapted for use with a plurality of insertable print heads, each having a linear orifice array, an interface system for coordinating such print heads for cooperative printing along a common linear print zone, said system comprising:
  (a) print head carriage means for traversing in a linear direction adjacent and approximately parallel to said print zone;
  (b) means, mounted on said carriage means, for receiving and releasably constraining such print heads with their linear orifice arrays precisely perpendicular to the direction of carriage traverse and vertically indexed to the direction of carriage traverse;
  (c) means for detecting the relative transverse locations of indexed orifice arrays; and
  (d) means for adjusting the information printing of each positioned cartridge in accordance with its particular detected transverse location.

3. In ink jet printing apparatus of the kind which includes means for advancing a print medium along a feed path so that successive line portions move sequentially past a linear print zone, an interface system for accurately interrelating, for cooperative printing, a plurality of insertable print heads of the type including drop generator elements, electrical leads to such elements and an orifice plate having a linear array of orifices, each aligned with respective drop generator elements, said interface system comprising:

(a) print head carriage means, mounted for transversing movement adjacent said linear print zone, and including means for insertably receiving and supporting a plurality of such print heads;

(b) means for traversing said carriage means in a traverse direction along a path adjacent said linear print zone;

(c) indexing means, mounted for traversing movement with said carriage means, and including means for physically positioning the print head orifice plastes at predetermined vertical locations relative to said traverse direction and with their orifice arrays orthogonal to said traverse direction;

(d) means, located adjacent the path of traversing movement of said support means, for detecting the relative transverse locations of the orifice arrays of each positioned print head; and (e) control means for adjusting the information printing outputs of each of the print heads respectively in accordance with the detected location of its orifice array.

4. An ink jet printing system for producing multicolor prints, said system comprising:

(a) a plurality of insertable print/cartridges, each including a plurality of drop generator elements, electrical leads for connecting such elements to a power source, an orifice plate having a linear array of orifices aligned with respective drop generator elements and an ink reservoir for supplying ink to said orifice array, at least two of such print/cartridges containing different color ink;

(b) print/cartridge carriage means for traversing in a linear direction adjacent and approximately parallel to said print zone;

(c) means, mounted on said carriage means, for receiving and releasably constraining such print/cartridges with their linear orifice arrays precisely perpendicular to the direction of carriage traverse and vertically indexed to the direction of carriage traverse;

(d) means for detecting the relative transverse locations of indexed orifice arrays; and (e) means for adjusting the information printing of each positioned cartridge in accordance with its particular detected transverse location.

5. An ink jet printing system for producing multicolor prints, said system comprising:

(a) a plurality of insertable print/cartridges, each including a plurality of drop generator elements, electrical leads for connecting such elements to a power source, an orifice plate having a linear array of orifices aligned with respective drop generator elements and an ink reservoir for supplying ink to said orifice array, at least two of such print/cartridges containing different color ink;

(b) carriage means for traversing said print zone and for receiving and physically indexing a plurality of such print heads in a transversely spaced relation with their orifice arrays precisely perpendicular to the direction of carriage traverse and in precise vertical inter-alignment based on said direction of carriage traverse;

(c) means for detecting and storing the relative transverse locations of indexed orifice arrays; and (d) means for controlling the printing acutations of each indexed print head in accordance with its detected transverse location.

6. Ink jet printing apparatus for printing with a plurality of insertable print/cartridges, each having (i) an orifice plate comprising orifices in a linear array, (ii) an ink reservoir for supplying ink to such orifices and (iii) a plurality of drop generators respectively aligned with such orifices, said apparatus comprising:

(a) carriage means for traversing said print zone and for receiving and physically indexing a plurality of such print/cartridges in a transversely spaced relation with their orifice arrays precisely perpendicular to the direction of carriage traverse and in precise vertical inter-alignment based on said direction of carriage traverse;

(b) means for detecting and storing the relative transverse locations of indexed orifice arrays; and (c) means for controlling the printing actuations of each indexed print/cartridge in accordance with its detected transverse location.

7. Ink jet printing apparatus for printing with a plurality of insertable print/cartridges, each having (i) an orifice plate comprising orifices in a linear array, (ii) an ink reservoir for supplying ink to such orifices and (iii) a plurality of drop generators respectively aligned with such orifices, said apparatus comprising:

(a) print/cartridge carriage means for traversing in a linear direction adjacent and approximately parallel to said print zone;

(b) means, mounted on said carriage means, for receiving and releasably constraining such print/cartridges with their linear orifice arrays precisely perpendicular to the direction of carriage traverse and vertically indexed to the direction of carriage traverse;

(c) means for detecting the relative transverse locations of indexed orifice arrays; and (d) means for adjusting the information printing of each positioned cartridge in accordance with its particular detected transverse location.

8. In ink jet printing apparatus of the kind which includes means for advancing a print medium along a feed path so that successive line portions move sequentially past a linear print zone and which is adapted for use with a print/cartridge of the type including drop generator elements, electrical leads to such elements and an orifice plate having a linear array of orifices aligned with respective drop generator elements, a print/cartridge interface system for accurately interrelating a plurality of such print/cartridges for cooperative printing, said interface system comprising:

(a) a carriage having a plurality of print/cartridge nests that are mounted for transversing movement as a unit adjacent said linear print zone, each nest including means for receiving and coarsely-positioning a print/cartridge;

(b) means for traversing said carriage in a linear direction past said linear print zone;

(c) means for physically indexing received print/cartridges so that their respective orifice arrays are indexed orthogonal to said linear direction and their orifices are precisely aligned along lines parallel to said linear direction;

(d) means for detecting the transverse spacing, along said linear direction, between the orifice arrays of such indexed print/cartridges; and (e) control means for adjusting the information printing outputs of each of indexed print/cartridges respectively in accordance with the detected location of its orifice array.

9. In ink jet printing apparatus adapted for use with an insertable print/cartridge having a linear array of orifices, an interface system for cooperative printing with a plurality of such cartridges along a common linear print zone, said system comprising:
  (a) carriage means for traversing adjacent and approximately parallel to said print zone;
  (b) means for releasably positioning a plurality of such print/cartridges in transversely spaced relation with the line of their orifice arrays precisely perpendicular to the direction of carriage traverse and so their corresponding orifices are vertically indexed along lines precisely parallel to the direction of carriage traverse;
  (c) means for detecting the relative transverse locations of the orifice arrays; and
  (d) means for adjusting the information printing of each positioned cartridge in accordance with its particular detected transverse location.

10. In ink jet printing apparatus adapted for printing successive pixels along a linear print zone with print/cartridges, including linear orifice arrays, an interface system for coordinating the drop placements from a plurality of such cartridges comprising:
  (a) carriage means for traversing said print zone and releasably indexing a plurality of such print/cartridges in transversely spaced relation with their orifice arrays orthogonal to the direction of carriage traverse and their individual orifices precisely located vertically, relative to the direction of carriage traverse;
  (b) means for detecting and storing the relative transverse locations of such orifice arrays; and
  (c) means for controlling the printing actuations of each positioned print/cartridge in accordance with its particular detected transverse location.

* * * * *